C. E. HENDRICK.

Improvement in Spring Bed-Bottoms.

No. 128,960. Patented July 16, 1872.

Witnesses:
H. Downing
G. J. Moore

C. E. Hendrick

UNITED STATES PATENT OFFICE.

CHARLES E. HENDRICK, OF CHICOPEE, MASSACHUSETTS.

IMPROVEMENT IN SPRING BED-BOTTOMS.

Specification forming part of Letters Patent No. 128,960, dated July 16, 1872.

*To all whom it may concern:*

Be it known that I, CHARLES E. HENDRICK, of Chicopee, in the county of Hampden and State of Massachusetts, have invented an Improved Spring Bed-Bottom; and I do hereby declare that the following is a full and exact description of the construction and operation of the same, reference being had to the annexed drawing making part of this specification.

Similar letters of reference indicate corresponding parts, of which—

Figure 1:
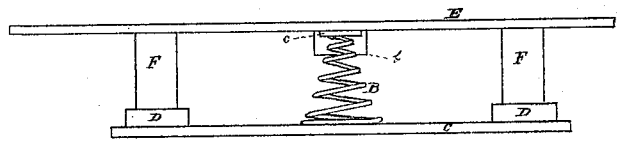
Figure 2:
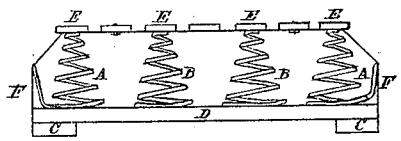
Figure 3:
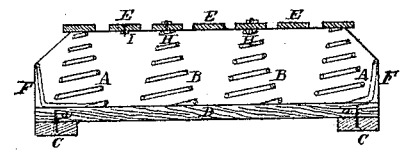
Figure 4:
Figure 5:
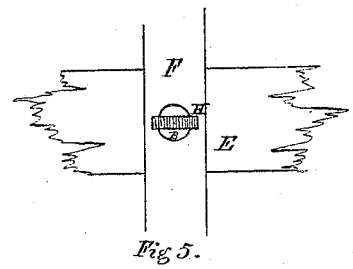
Figure 6:
Figure 7:

Figure 1 is a side elevation, Fig. 2 an end view, and Fig. 3 a transverse section of it, the said section being taken through one set of staple-springs and springs. Fig. 4 is a view of staple-spring A, showing its appearance. Fig. 5 is an under-side view of a band at one of its slat-crossings, showing the head of bolt acting on the spring; Fig. 6, a view of grooved-armed bolt with nut; Fig. 7, view of broad-slotted nut with screw.

In this bed-bottom I employ two series of springs, B, those on the end being staple-springs A, which, at their base, rest on two cross-bars, D D, connected by common screws $a$ to two horizontal bars, C C. The two belts F F are extended over and upon each series of springs, A and B, and fastened to the cross-bars D D, a single belt, or a double or socket belt, being two sewed together, with an opening for sliding in slats E when not resting on the springs. Slats E, when resting on springs A B, are connected by bolts H with arms, or slotted nut I with common screw. This bolt H consists of arms extended each side, with grooves for grasping and holding the springs B in place, or, without the groove, by nut drawing on it through slat E. A series of such slats, E, is disposed upon the two bands F, and fastened in the manner as represented. The staple-spring A, Fig. 4, is constructed of one piece of wire, being a continuance of a spring for a fastening and for a staple or band-support, relieving the springs of too much pressure by weight coming on the staple part, and constructed as shown in Fig. 4. The cross-slat $c$, Fig. 1, is resting at each end on spring B for supporting the pressure on any particular slat, to be used when desired for a heavy person. Staple $c$ keeps the cross-slat in position.

What I claim as my invention is—

1. The staple-spring A, formed of one piece, constructed as described, and for the purposes set forth.

2. The arrangement and combination of the staple-springs A, constructed as described, with cross-bands F F, springs B, their support-bars D D, and slats E, being fastened by broad-armed bolt H, or slot-nut I operating by screw, the whole being substantially as described.

CHAS. E. HENDRICK.

Witnesses:
HIRAM DOWNING,
JOSEPH J. MOORE.